United States Patent
Lee et al.

(10) Patent No.: US 12,538,441 B2
(45) Date of Patent: Jan. 27, 2026

(54) DISPLAY DEVICE

(71) Applicant: LG Display Co., Ltd., Seoul (KR)

(72) Inventors: Hyosung Lee, Gyeonggi do (KR); SeungHee Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 170 days.

(21) Appl. No.: 18/520,312

(22) Filed: Nov. 27, 2023

(65) Prior Publication Data

US 2024/0224445 A1 Jul. 4, 2024

(30) Foreign Application Priority Data

Dec. 30, 2022 (KR) .......................... 10-2022-0191240

(51) Int. Cl.
| | |
|---|---|
| *H05K 5/02* | (2006.01) |
| *F03G 1/02* | (2006.01) |
| *F03G 1/08* | (2006.01) |
| *F03G 1/10* | (2006.01) |

(52) U.S. Cl.
CPC ........... *H05K 5/0217* (2013.01); *F03G 1/022* (2021.08); *F03G 1/08* (2013.01); *F03G 1/10* (2013.01)

(58) Field of Classification Search
CPC ........................... H05K 5/0017; H05K 5/0217
USPC .................................. 361/807, 755, 809, 810
See application file for complete search history.

(56) References Cited

U.S. PATENT DOCUMENTS

| | | | |
|---|---|---|---|
| 5,464,052 A * | 11/1995 | Wieczorek .............. | B60R 5/047 |
| | | | 296/37.16 |
| 10,177,634 B2 | 1/2019 | Lee | |
| 2016/0365776 A1 | 12/2016 | Lee | |
| 2017/0344073 A1* | 11/2017 | Kang ..................... | G06F 1/1679 |
| 2021/0183275 A1* | 6/2021 | Han ........................ | G09F 9/301 |
| 2023/0217609 A1 | 7/2023 | Lee et al. | |

FOREIGN PATENT DOCUMENTS

| | | |
|---|---|---|
| KR | 10-2014-0100460 A | 8/2014 |
| KR | 10-2016-0144820 A | 12/2016 |
| KR | 10-2023-0102625 A | 7/2023 |

* cited by examiner

*Primary Examiner* — Hung S. Bui
(74) *Attorney, Agent, or Firm* — Fenwick & West LLP

(57) ABSTRACT

According to an aspect of the present disclosure, a display device includes: a display unit including a display panel in which an image is displayed; a first roller configured to wind or unwind the display unit; a tape spring which vertically moves the display unit on a rear surface of the display unit; and a second roller configured to wind or unwind the tape spring, the second roller includes: a tape spring drum to which one end of the tape spring is fixed and configured to wind or unwind the tape spring; a tape spring case accommodating the tape spring drum and the tape spring; and a corrugate spring between the tape spring drum and the tape spring case and configured to press the tape spring toward the tape spring drum. Therefore, a slip phenomenon of the tape spring may be improved.

14 Claims, 13 Drawing Sheets

DISPLAY DEVICE

CROSS-REFERENCE TO RELATED APPLICATIONS

This application claims the priority of Korean Patent Application No. 10-2022-0191240 filed on Dec. 30, 2022, in the Korean Intellectual Property Office, the disclosure of which is incorporated herein by reference.

BACKGROUND

Field

The present disclosure relates to a display device, and more particularly, to a rollable display device which is capable of displaying images even in a rolled state.

Description of the Related Art

As display devices which are used for a monitor of a computer, a television, or a cellular phone, there are an organic light emitting display (OLED) device which is a self-emitting device and a liquid crystal display (LCD) device which requires a separate light source.

An applicable range of the display device is diversified to personal digital assistants as well as monitors of computers and televisions and a display device with a large display area and a reduced volume and weight is being studied.

Further, recently, a rollable display device which is manufactured by forming a display unit and a wiring line on a flexible substrate such as plastic which is a flexible material so as to be capable of displaying images even though the display device is rolled is getting attention as a next generation display device.

SUMMARY

An object to be achieved by the present disclosure is to provide a display device which suppresses a gap and a slip phenomenon of a tape spring by means of a corrugate spring.

Another object to be achieved by the present disclosure is to provide a display device which suppresses the slip of the display unit.

Objects of the present disclosure are not limited to the above-mentioned objects, and other objects, which are not mentioned above, can be clearly understood by those skilled in the art from the following descriptions.

According to an aspect of the present disclosure, a display device includes: a display unit including a display panel in which an image is displayed; a first roller configured to wind or unwind the display unit; a tape spring which vertically moves the display unit on a rear surface of the display unit; and a second roller configured to wind or unwind the tape spring, the second roller includes: a tape spring drum to which one end of the tape spring is fixed and configured to wind or unwind the tape spring; a tape spring case accommodating the tape spring drum and the tape spring; and a corrugate spring between the tape spring drum and the tape spring case and configured to press the tape spring toward the tape spring drum.

Other detailed matters of the exemplary embodiments are included in the detailed description and the drawings.

According to the present disclosure, a corrugate spring is configured to press the tape spring to suppress a gap generated between the wound tape springs.

According to the present disclosure, a slip phenomenon of the tape spring is improved to stably lift and lower the display unit.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1A:
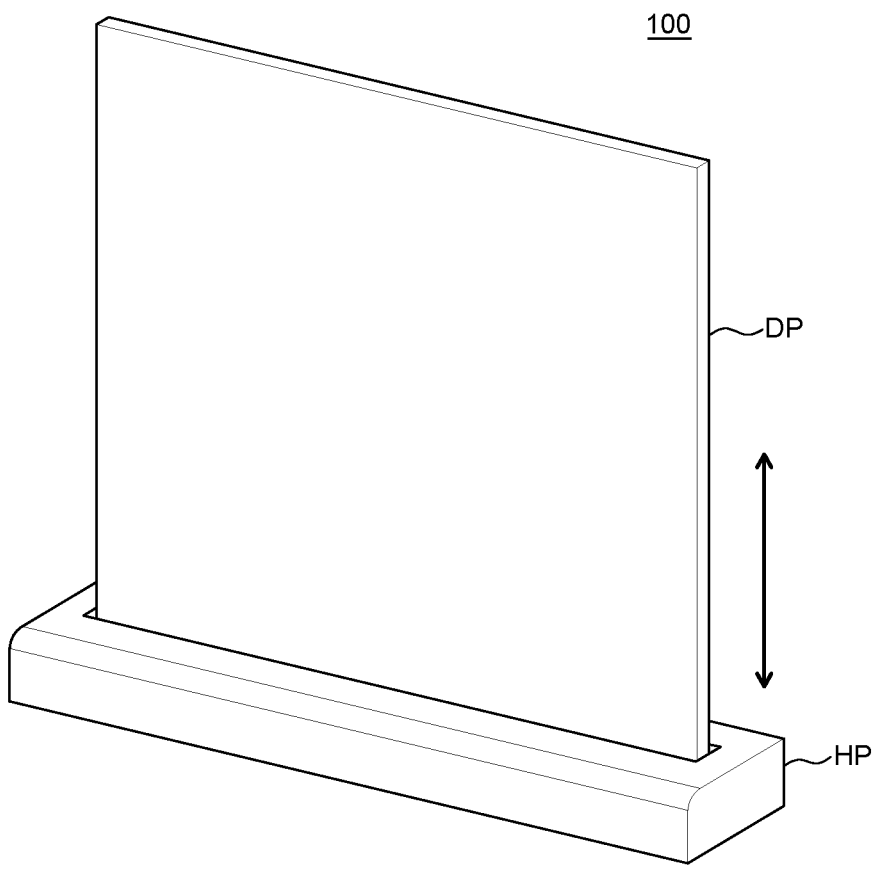
FIGS. 1A and 1B are perspective views of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, the present disclosure will be described in detail with reference to accompanying drawings.

<Display Device-Rollable Display Device>

Figure 1B:
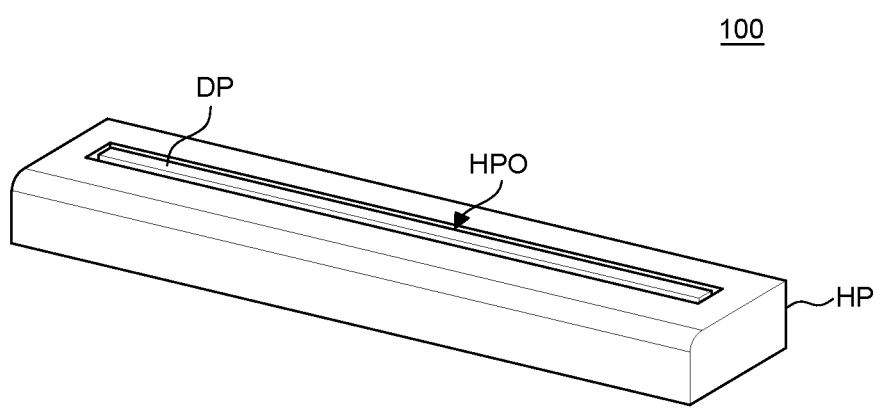

FIGS. 1A and 1B are perspective views of a display device according to an exemplary embodiment of the present disclosure.

First, referring to FIGS. 1A and 1B, a display device 100 according to an exemplary embodiment of the present disclosure includes a display unit DP and a housing unit HP.

The display unit DP is a configuration for displaying images to a user and for example, in the display unit DP, a display element and a circuit, a wiring line, and a component for driving the display element may be disposed. In this case, since the display device 100 according to the exemplary embodiment of the present disclosure is a rollable display device 100, the display unit DP may be configured to be wound and unwound. For example, the display unit DP may be formed of a display panel and a plurality of back bars each having flexibility to be wound or unwound. The display unit DP will be described below in more detail with reference to FIGS. 2 and 3.

The housing unit HP is a case in which the display unit DP is accommodated. The display unit DP may be wound to be accommodated in the housing unit HP and the display unit DP may be unwound to be disposed at the outside of the housing unit HP.

The housing unit HP has an opening HPO through which the display unit DP moves to the inside and the outside of the housing unit HP. The display unit DP may move in a vertical direction by passing through the opening HPO of the housing unit HP.

In the meantime, the display unit DP of the display device 100 may be switched from a fully unwound state to a fully wound state or from a fully wound state to a fully unwound state. In addition, between the fully unwound state and the fully wound state, there may be one or more intermediate states for the display unit, such as partially unwound state or partially wound state, and the present disclosure is not limited thereto.

FIG. 1A illustrates the display unit DP of the display device 100 which is fully unwound and in the fully unwound state, the display unit DP of the display device 100 is disposed at the outside of the housing unit HP. That is, in order for a user to watch images through the display device 100, when the display unit DP is unwound to be disposed at the outside of the housing unit HP as much as possible and cannot be further unwound any more, it may be defined as a fully unwound state.

FIG. 1B illustrates the display unit DP of the display device 100 which is fully wound and in the fully wound state, the display unit DP of the display device 100 is accommodated in the housing unit HP and cannot be further wound. That is, when the user does not watch the images through the display device 100, it is advantageous from the viewpoint of an outer appearance that the display unit DP is not disposed at the outside of the housing unit HP. Therefore, when the display unit DP is wound to be accommodated in the housing unit HP, it is defined as a fully wound state. Further, when the display unit DP is in a fully wound state to be accommodated in the housing unit HP, a volume of the display device 100 is reduced and the display device 100 may be easily carried.

<Display Unit>

Figure 2:
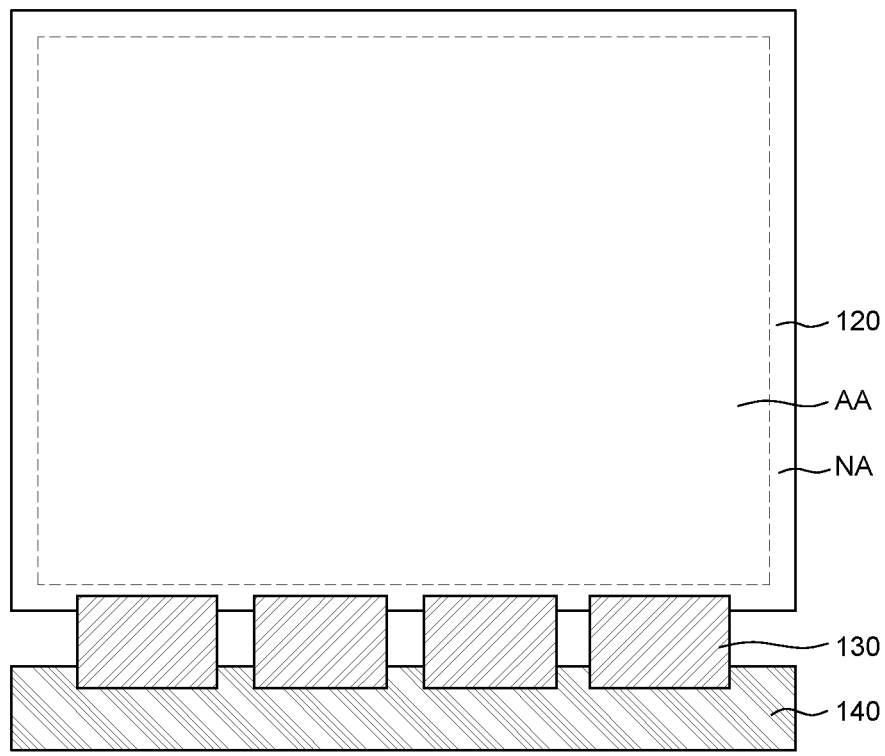
FIG. 2 is a plan view of a display unit of a display device according to an exemplary embodiment of the present disclosure.
Figure 3:
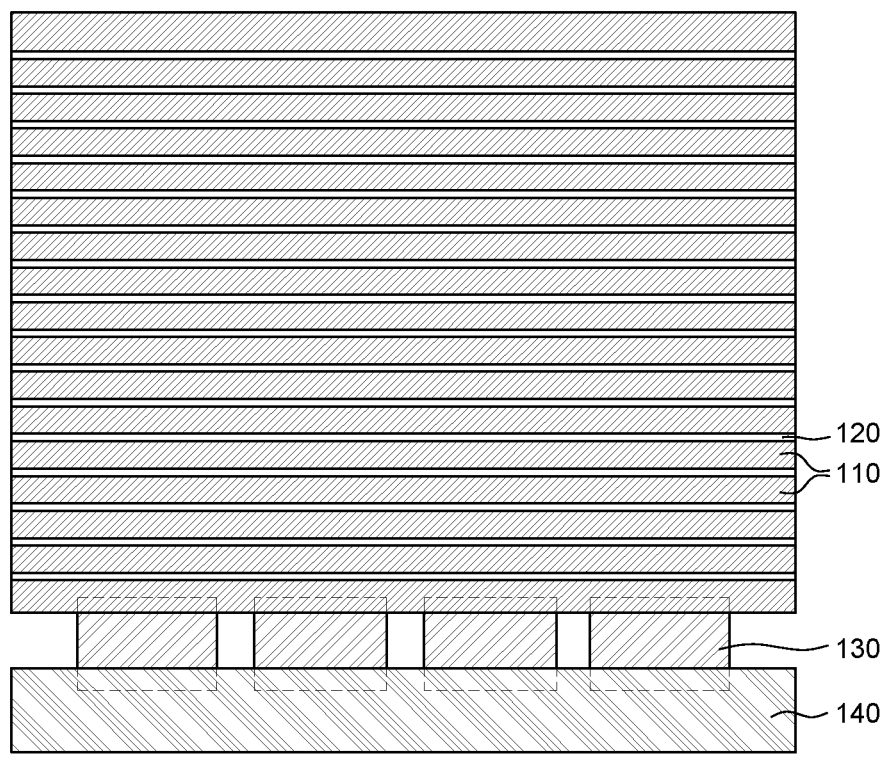
FIG. 3 is a rear view of a display unit of a display device according to an exemplary embodiment of the present disclosure.

FIG. 2 is a plan view of a display unit of a display device according to an exemplary embodiment of the present disclosure. FIG. 3 is a rear view of a display unit of a display device according to an exemplary embodiment of the present disclosure.

Referring to FIGS. 2 and 3, the display unit DP of the display device 100 includes a plurality of back bars 110, a display panel 120, a flexible film 130, and a printed circuit board 140.

The display panel 120 is a panel for displaying images to a user. The display panel 120 may include a display element which displays images, a driving element which drives the display element, and wiring lines which transmit various signals to the display element and the driving element.

The display element may be defined in different ways depending on a type of the display panel 120. For example, when the display panel 120 is an organic light emitting display panel, the display element may be an organic light emitting diode which includes an anode, an organic light emitting layer, and a cathode. For example, when the display panel 120 is a liquid crystal display panel, the display element may be a liquid crystal display element. When the display panel 120 is a light emitting display panel including an LED, the display element may be an LED. Hereinafter, even though the display panel 120 is assumed as an organic light emitting display panel, the display panel 120 is not limited to the organic light emitting display panel. Further, since the display device 100 according to the exemplary embodiment of the present disclosure is a rollable display device, the display panel 120 may be implemented as a flexible display panel to be wound to or unwound from the roller unit.

Referring to FIG. 2, the display panel 120 includes an active area AA and a non-active area NA.

The active area AA is an area where images are displayed in the display panel 120. In the active area AA, a plurality of sub pixels which configures the plurality of pixels and a driving circuit for driving the plurality of sub pixels may be disposed. The plurality of sub pixels is minimum units which configure the active area AA and a display element may be disposed in each of the plurality of sub pixels. For example, an organic light emitting diode which includes an anode, an organic light emitting layer, and a cathode may be disposed in each of the plurality of sub pixels, but it is not limited thereto. Further, a circuit for driving the plurality of sub pixels may include a driving element and a wiring line. For example, the circuit may be configured by a thin film transistor, a storage capacitor, a gate line, and a data line, but is not limited thereto.

The non-active area NA is an area where no image is displayed. The non-active area NA is disposed so as to enclose an outer periphery of the active area AA. In the non-active area NA, various wiring lines and circuits for driving the organic light emitting diode of the active area AA are disposed. For example, in the non-active area NA, a link line which transmits signals to the plurality of sub pixels and circuits of the active area AA or a driving IC such as a gate driver IC or a data driver IC may be disposed, but it is not limited thereto.

The flexible film 130 is a film in which various components are disposed on a base film having a ductility. The flexible film 130 has a ductility so that a partial area may be wound to or unwound from the roller unit together with the display panel 120. The flexible film 130 supplies a signal to the plurality of sub pixels and the circuits of the active area AA and is electrically connected to the display panel 120. The flexible film 130 is disposed at one end of the non-active area NA of the display panel 120 to supply a power voltage or a data voltage to the plurality of sub pixels and the circuits of the active area AA. The number of flexible films 130 illustrated in FIG. 2 is illustrative and the number of flexible films 130 may vary depending on the design, but is not limited thereto.

In the meantime, for example, a driving IC such as a gate driver IC or a data driver IC may also be disposed on the flexible film 130. The driving IC is a component which processes data for displaying images and a driving signal for processing the data. The driving IC may be disposed by a chip on glass (COG), a chip on film (COF), or a tape carrier package (TCP) technique depending on a mounting method. However, for the convenience of description, it is described that the driving IC is mounted on the flexible film 130 by a chip on film manner, but is not limited thereto.

The printed circuit board 140 is disposed at one end of the flexible film 130 to be connected to the flexible film 130. The printed circuit board 140 is a component which supplies signals to the driving IC. The printed circuit board 140 supplies various signals such as a driving signal or a data signal to the driving IC. Various components may be disposed on the printed circuit board 140. For example, a timing controller and a power source unit may be disposed on the printed circuit board 140. Even though one printed circuit board 140 is illustrated in FIG. 2, the number of printed circuit boards 140 may vary depending on the design and is not limited thereto.

Even though not illustrated in FIG. 2, an additional printed circuit board which is connected to the printed circuit board 140 may be further disposed. For example, the printed circuit board 140 may be referred to as a source printed circuit board S-PCB on which the data driver is mounted and the additional printed circuit board connected to the printed circuit board 140 may be referred to as a control printed circuit board C-PCB on which a timing controller is mounted. The additional printed circuit board may be disposed in the roller unit or disposed in the housing unit HP at the outside of the roller unit.

Referring to FIG. 3, the plurality of back bars 110 may be disposed on a rear surface of the display panel 120. The plurality of back bars 110 may support the display panel 120 and when the display panel 120 is wound to or unwound from the roller unit, a supporting force of the back bars 110 supports the display panel 120 and suppresses the scratches and damages of the display panel 120. The plurality of back bars 110 may be referred to as aprons. The plurality of back bars 110 may be formed of a plastic material, but is not limited thereto. In the meantime, the plurality of back bars 110 may be adhered by a separate adhesive layer or a foam tape.

Even though in FIGS. 2 and 3, it is illustrated that the plurality of back bars 110 is disposed on the rear surface of the display panel 120, a back cover having a plurality of openings may be additionally disposed between the display panel 120 and the plurality of back bars 110. Further, only the back cover may be used without using the plurality of back bars 110. The plurality of back bars 110 or the back cover may be referred to as a support unit, a support member, a support element or a support plate, and the present disclosure is not limited thereto.

<Structure of Display Device>

Figure 4A:
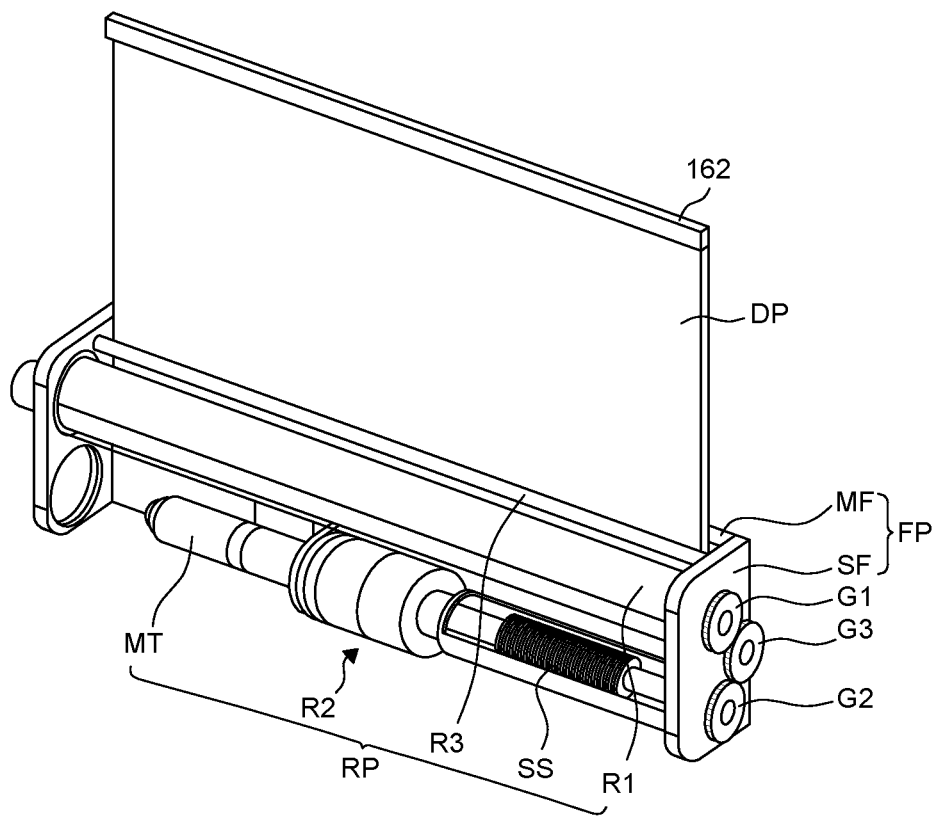
FIG. 4A is a front perspective view of a display device according to an exemplary embodiment of the present disclosure.
Figure 4B:
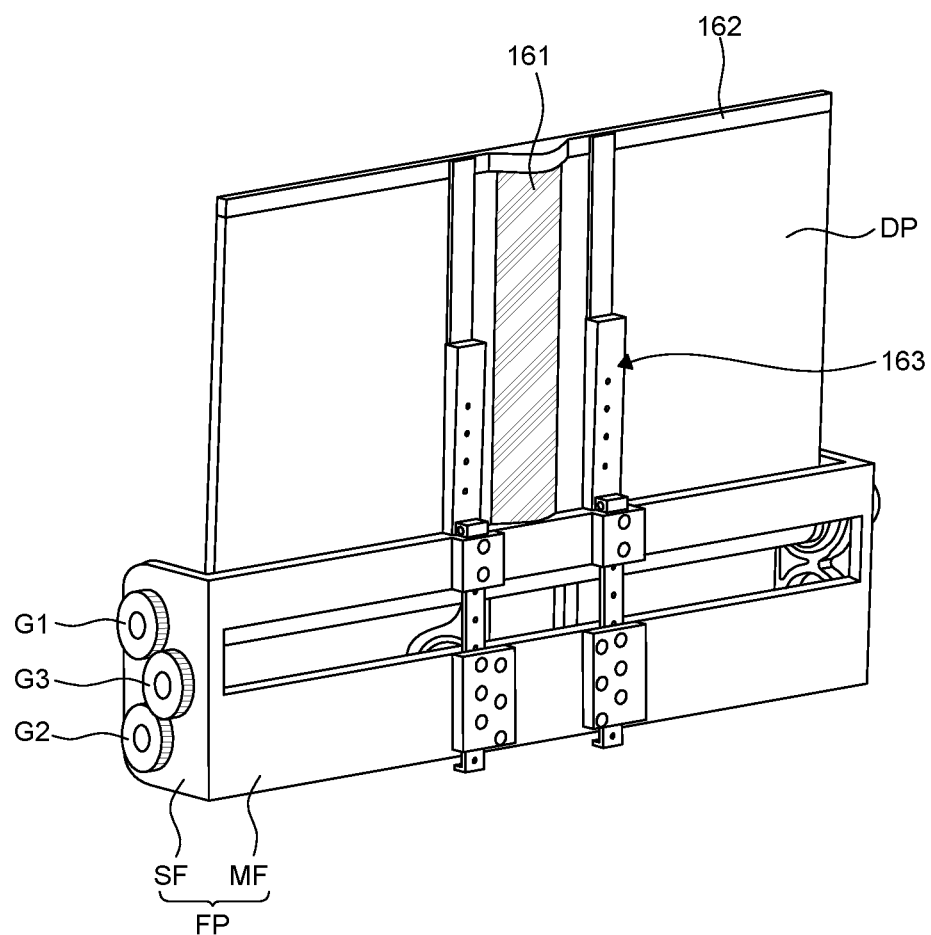
FIG. 4B is a rear perspective view of a display device according to an exemplary embodiment of the present disclosure.

FIG. 4A is a front perspective view of a display device according to an exemplary embodiment of the present disclosure. FIG. 4B is a rear perspective view of a display device according to an exemplary embodiment of the present disclosure.

Referring to FIGS. 4A and 4B, the display device 100 includes a display unit DP, a roller unit RP, a frame unit FP, a tape spring 161, a head bar 162, and a slide unit 163.

The roller unit RP includes a first roller R1, a second roller R2, a third roller R3, a motor MT, and a spiral spring SS.

The first roller R1 is configured to rotate in a clockwise direction or a counterclockwise direction. Therefore, the first roller R1 winds or unwinds the display unit DP. The first roller R1 is configured to have a cylindrical shape, but is not limited thereto.

The second roller R2 is configured to rotate in a clockwise direction or a counterclockwise direction. Therefore, the second roller R2 winds or unwinds the tape spring 161. The second roller R2 is disposed below the first roller R1, but is not limited thereto. The second roller R2 will be described below with reference to FIGS. 5 to 7.

The third roller R3 is configured to rotate in a clockwise direction or a counterclockwise direction. The third roller R3 is disposed to be adjacent to the first roller R1. The third roller R3 is disposed in a path through which the display unit DP is wound or unwound. Therefore, the third roller R3 guides the winding or unwinding of the display unit DP.

The motor MT is connected to the second roller R2 at one end of the second roller R2. The motor MT rotates the first roller R1, the second roller R2, and the third roller R3 of the roller unit RP in a clockwise direction or a counterclockwise direction. The motor MT is connected to a power source unit, such as a separate external power source or a built-in battery, to be supplied with the power.

The spiral spring SS is connected to the second roller R2 at the other end of the second roller R2. The spiral spring SS is an elastic member. The spiral spring SS applies a tension to the display unit DP during the winding or unwinding to maintain a flat state of the display unit DP. Specifically, the spiral spring SS applies the force in the winding direction of the roller unit RP using the tension of the spring. That is, an elastic force which is accumulated in the spiral spring SS when the display unit DP is wound may be increased. Therefore, when the display unit DP is fully unwound, the tension is applied to the display unit DP to be maintained in a flat state and to easily wind the display unit DP. Further, the display unit DP may be more easily unwound by the elastic force of the spiral spring SS.

The frame unit FP is coupled to the roller unit RP to support the roller unit RP. The frame unit FP includes a main frame MF and side frames SF in both sides of the main frame MF. The slide unit 163 is coupled to the main frame MF. The roller unit RP is coupled to the slide unit 163.

The frame unit FP includes a first gear G1, a second gear G2, and a third gear G3 coupled to the side frame SF. The first gear G1 is coupled to an end of the first roller R1 to rotate together with the first roller R1. The second gear G2 is coupled to an end of the spiral spring SS connected to the second roller R2 to rotate together with the second roller R2. The third gear G3 is configured to be engaged with the first gear G1 and the second gear G2 between the first gear G1 and the second gear G2. Therefore, the rotation of the motor MT is sequentially transmitted to the second roller R2, the spiral spring SS, the second gear G2, the third gear G3, and the first gear G1. The first roller R1 and the second roller R2 rotate together by the rotation of the second gear G2, the third gear G3, and the first gear G1.

The tape spring 161 moves the display unit DP in a vertical direction in response to the driving of the roller unit RP. The tape spring 161 is disposed on the rear surface of the display unit DP. An upper end of the tape spring 161 is fixed to the upper end of the display panel 120 and the lower end of the tape spring 161 is fixed to the second roller R2. Therefore, the tape spring 161 may be wound to or unwound from the second roller R2 and moves the display unit DP in a vertical direction in response to the driving of the roller unit RP.

The tape spring 161 may be a bistable reeled composite (BRC) member. The tape spring 161 is stretched or bent in a row direction, that is, a width direction of the tape spring 161 to be wound or unwound in a column direction, that is, a length direction of the tape spring 161. When the tape spring 161 is maintained in a flat state in a row direction, the tape spring 161 is wound in the column direction. In contrast, when the tape spring 161 is maintained in a bent state in a row direction, the tape spring 161 has a rigidity in the column direction to be stretched in the length direction.

At this time, the rigidity of the tape spring 161 in the column direction is related to a degree of bending the tape spring 161 in the row direction. That is, the degree of bending the tape spring 161 in the row direction may be appropriately selected according to a rigidity required for the display unit DP in the column direction.

In the display device 100 according to the exemplary embodiment, an operation of stretching or bending the tape spring 161 in the row direction is performed to induce the tape spring 161 to be wound or unwound in the column direction. Specifically, during the winding operation of the roller unit RP, the tape spring 161 is wound in the column direction to be wound on the second roller R2. At this time, the display panel 120 is wound on the first roller R1 while moving together with the tape spring 161. Further, during the unwinding operation of the roller unit RP, the tape spring 161 is spread in the column direction to be unwound from the second roller R2. At this time, the display panel 120 is unwound from the first roller R1 while moving together with the tape spring 161.

During the unwinding operation of the roller unit RP, the tape spring 161 which is stretched in the column direction has a rigidity in the column direction so that the rocking and twisting of the unwound display panel 120 may be restrained. Therefore, as long as additional external force is not applied, the unwound display panel 120 may maintain the flat state due to the rigidity of the tape spring 161.

The head bar 162 may be disposed on an uppermost edge of the display unit DP. The head bar 162 is disposed so as to fix the upper ends of the display unit DP and the tape spring 161. The head bar 162 covers only a part of a surface which is adjacent to an uppermost edge of the display unit DP so as not to hide an image displayed on the front surface of the display unit DP. For example, the display unit DP and the head bar 162 may be fixed by a screw, but are not limited thereto.

The slide unit 163 is disposed on the rear surface of the display unit DP. One end of the slide unit 163 is fixed to the main frame MF and the other end is fixed to the head bar 162. A pair of slide units 163 is provided and is disposed in both sides of the tape spring 161 one by one, but is not limited thereto. The slide unit 163, for example, may slide to extend or be contracted by three steps. The slide unit 163 moves the display unit DP in the vertical direction together with the tape spring 161. Further, when the display unit DP is unwound, the slide unit 163 suppresses the rocking of the display unit DP and supports the display unit DP.

<Structure of Second Roller Unit>

Figure 5:
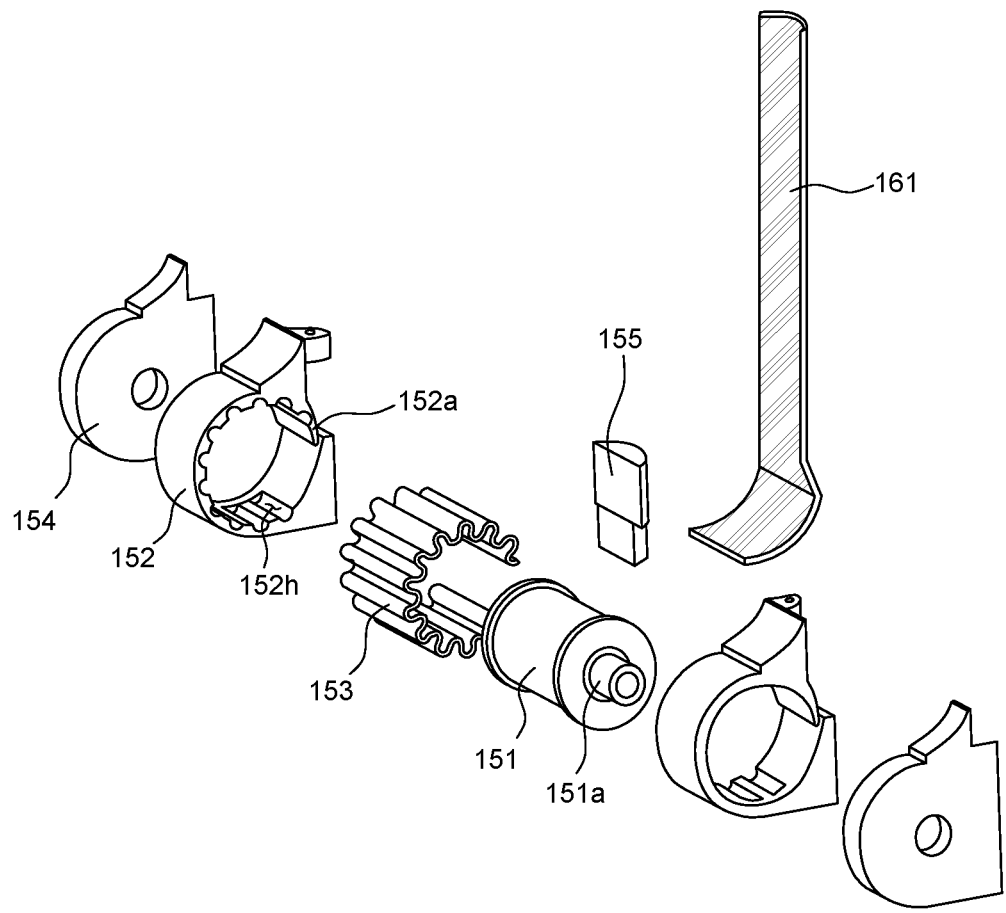
FIG. 5 is an exploded perspective view of a second roller of a display device according to an exemplary embodiment of the present disclosure.
Figure 6:
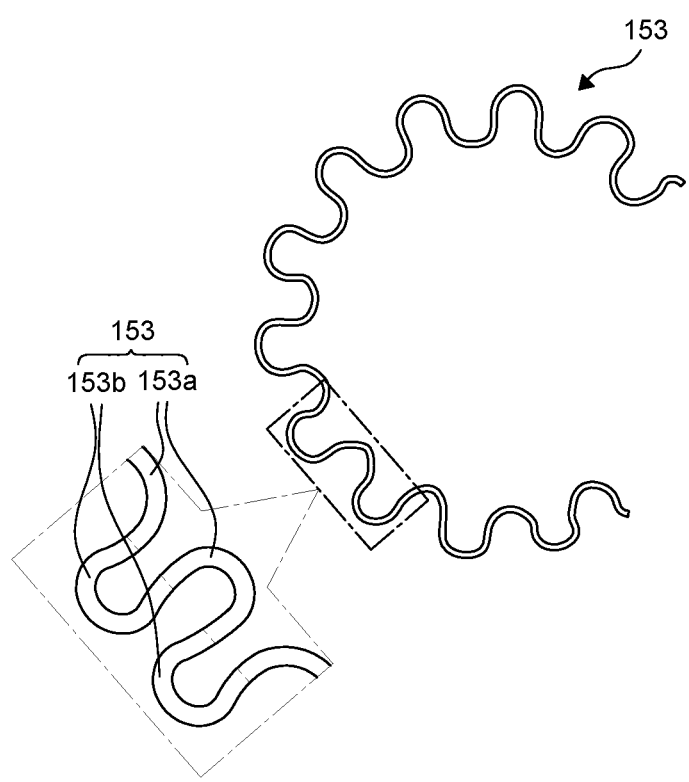
FIG. 6 is a cross-sectional view of a corrugate spring of a second roller of a display device according to an exemplary embodiment of the present disclosure.

FIG. 5 is an exploded perspective view of a second roller of a display device according to an exemplary embodiment of the present disclosure. FIG. 6 is a cross-sectional view of a corrugate spring of a second roller of a display device according to an exemplary embodiment of the present disclosure.

Referring to FIGS. 5 and 6, the second roller R2 includes a tape spring drum 151, a tape spring case 152, a corrugate spring 153, a tape spring side case 154, and a tape spring supporter 155.

The tape spring drum 151 has a cylindrical shape and one side thereof is connected to the motor MT. Therefore, the tape spring drum 151 may rotate in a clockwise direction or a counterclockwise direction in accordance with the operation of the motor MT. One end of the tape spring 161 is fixed to the tape spring drum 151. The tape spring 161 fixed to the tape spring drum 151 is wound to or unwound from the tape spring drum 151 as the tape spring drum 151 rotates in a clockwise direction or a counterclockwise direction by the motor MT. That is, the tape spring drum 151 may be configured to wind or unwind the tape spring 161.

In the meantime, the tape spring drum 151 includes a tape spring drum extension 151a which outwardly extends. That is, the tape spring drum extension 151a may be disposed to protrude outwardly from the tape spring drum 151 as illustrated in FIG. 5. Further, a spiral spring SS may be coupled to the tape spring drum extension 151a. Therefore, the spiral spring SS applies a tension to the display unit DP during the winding or unwinding to maintain a flat state of the display unit DP.

The tape spring case 152 may be configured to accommodate the tape spring drum 151, the corrugate spring 153, and the tape spring 161. The tape spring case 152 is provided as a pair and the pair of tape spring cases 152 may be coupled to each other while accommodating the tape spring drum 151. The tape spring case 152 may be disposed to enclose outer peripheral surfaces of the tape spring drum 151 and the corrugate spring 153. The tape spring case 152 has a shape to allow the tape spring 161 to be wound to or unwound from the tape spring drum 151. Further, the tape spring case 152 may be partially open so that the tape spring 161 passes therethrough. That is, the tape spring case 152 includes an opening configured to allow the tape spring 161 to enter and exit.

The tape spring case 152 further includes a guide portion 152a which protrudes from an end portion to the opening. The guide portion 152a guides the path of the tape spring 161. That is, the guide portion 152a guides the path of the tape spring 161 so as not to deviate from the path of the tape spring 161. Therefore, the tape spring 161 may be more stably wound or unwound by the guide portion 152a. Further, the guide portion 152a may smooth out a sharp shape change formed by unwinding the tape spring 161. Therefore, an outer surface of the guide portion 152a is formed as a curved surface, but is not limited thereto.

The tape spring case 152 may be configured so as not to rotate by the operation of the motor MT. For example, the tape spring case 152 may be fixed to the frame unit FP so that even though the tape spring drum 151 accommodated in the tape spring case 152 rotates by the operation of the motor MT, the tape spring case 152 may not rotate.

The corrugate spring 153 is disposed between the tape spring drum 151 and the tape spring case 152. The corrugate spring 153 may be configured by a spiral spring. Further, the corrugate spring 153 may be configured by an elastic material. The corrugate spring 153 is configured to press the tape spring 161 which is wound on the tape spring drum 151 toward the tape spring drum 151. Therefore, the slip phenomenon caused when the tape spring 161 is wound on the tape spring drum 151 may be improved. This will be described in more detail with reference to FIGS. 7A to 7C.

Referring to FIG. 6, the corrugate spring 153 includes a plurality of first parts 153a and a plurality of second parts 153b. The plurality of first parts 153a and the plurality of second parts 153 are alternately disposed. The plurality of first parts 153a and the plurality of second parts 153 are integrally configured. The plurality of first parts 153a and the plurality of second parts 153b may have a wavy shape. At this time, a bending direction of the plurality of first parts 153a and a bending direction of the plurality of second parts 153b are opposite to each other. Specifically, the plurality of first parts 153a may refer to a bent portion to be in contact with the tape spring 161 or the tape spring drum 151. The plurality of second parts 153b refers to a bent portion to be in contact with the tape spring case 152. Therefore, the corrugate spring 153 guides the winding of the tape spring 161 between the tape spring drum 151 and the tape spring case 152.

In the meantime, the tape spring case 152 has an inner surface shape corresponding to a shape of the corrugate spring 153. For example, the tape spring case 152 includes a groove 152h into which the plurality of second parts 153 are inserted, but the present disclosure is not limited thereto.

Tape spring side cases 154 may be disposed in both sides of the pair of tape spring cases 152. The tape spring side case 154 covers side surfaces of the tape spring case 152, the tape spring drum 151 accommodated in the tape spring case 152, and the corrugate spring 153. Therefore, the tape spring drum 151 and the corrugate spring 153 may be configured to be more stably accommodated in the tape spring case 152. At this time, the tape spring case 152 and the tape spring side cases 154 may be configured to be separable, as illustrated in FIG. 5, but may also be integrally configured, but is not limited thereto.

The tape spring supporter 155 is disposed above the tape spring case 152. The tape spring supporter 155 may be connected to the tape spring case 152 so as to correspond to the position of the tape spring 161 accommodated in the tape spring case 152. Therefore, the tape spring supporter 155 may guide the tape spring 161 accommodated in the tape spring case 152 to be wound or unwound. Further, the tape spring supporter 155 suppresses the rocking of the tape spring 161 and firmly supports the tape spring 161.

In the meantime, even though it is not illustrated in the drawing, a bearing is disposed between the tape spring case 152 and the tape spring side case 154. The bearing is coupled to both sides of the tape spring drum 151. The bearing may support both sides of the tape spring drum 152 so that the tape spring drum 151 rotates with respect to the tape spring case 152.

Figure 7A:
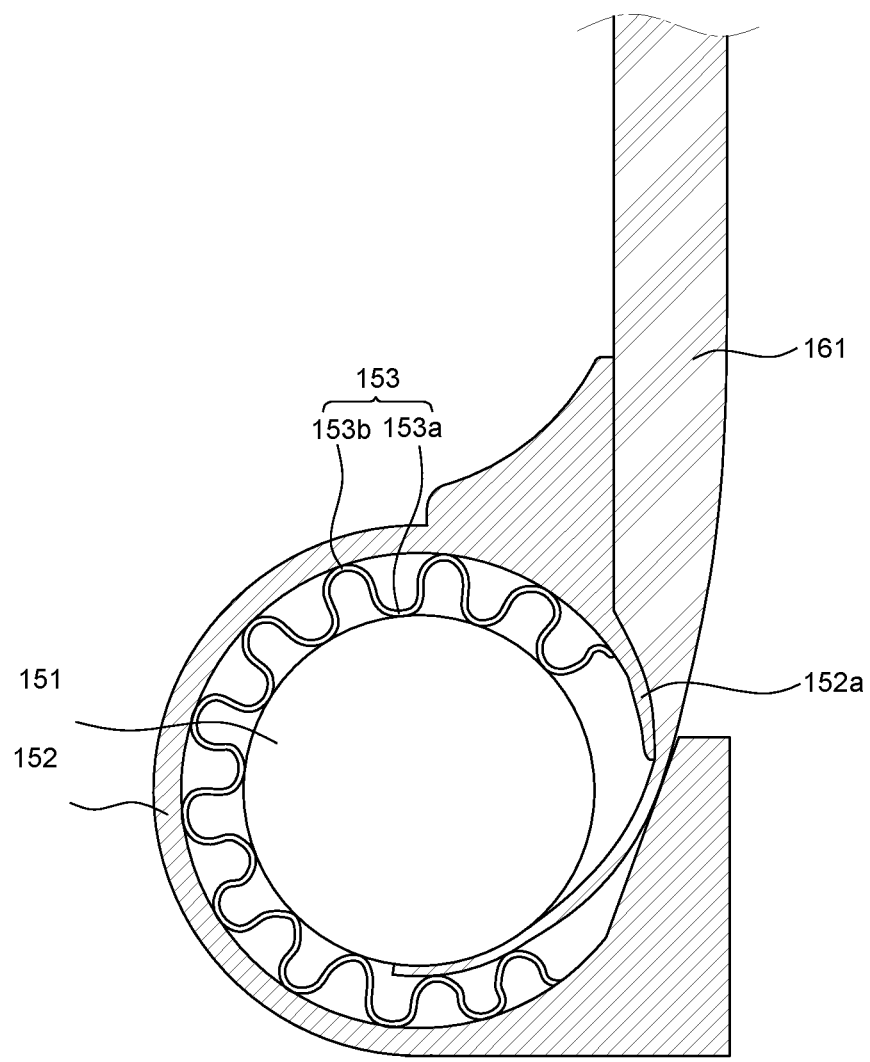
FIGS. 7A to 7C are cross-sectional views for explaining an operation of a second roller of a display device according to an exemplary embodiments of the present disclosure.
Figure 7B:
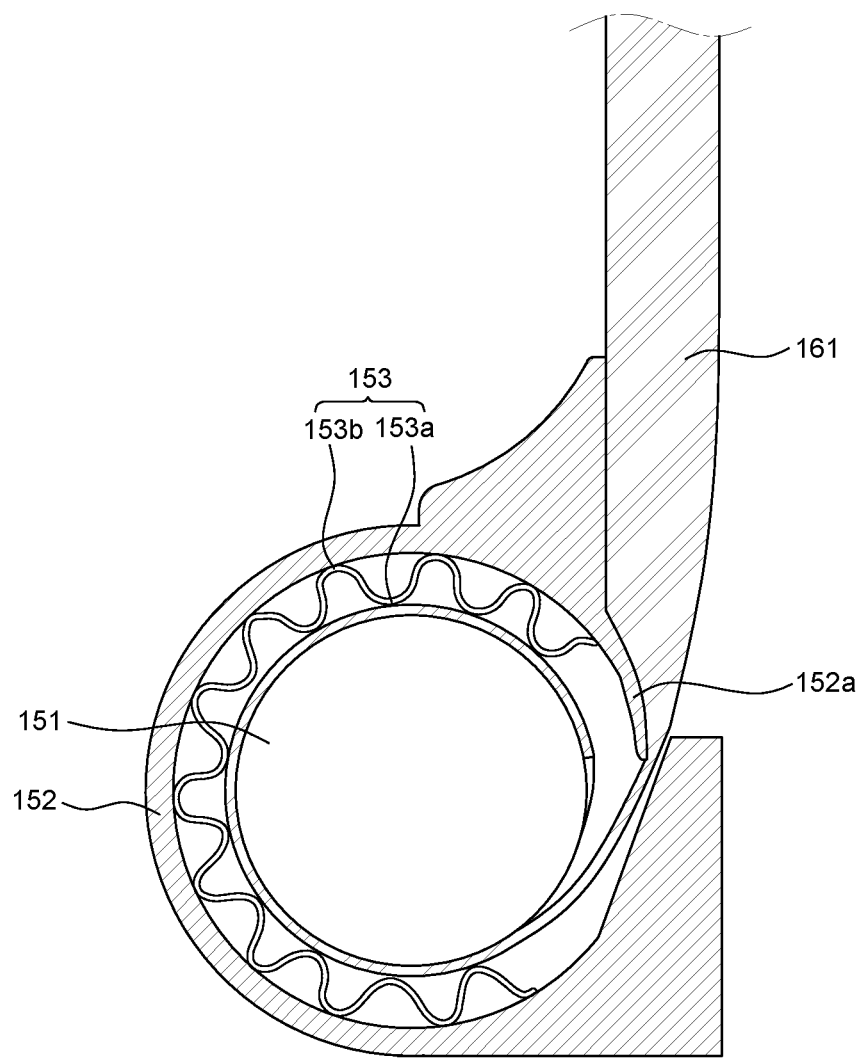
Figure 7C:
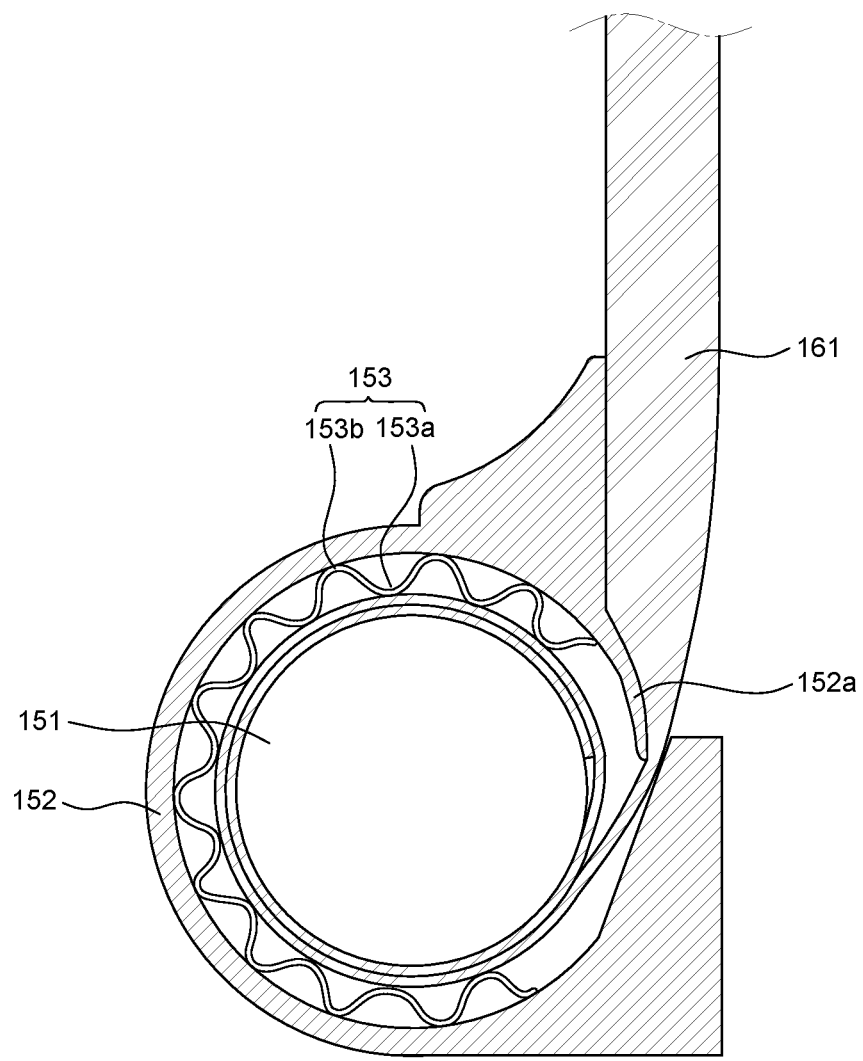

FIGS. 7A to 7C are cross-sectional views for explaining an operation of a second roller of a display device according to an exemplary embodiment of the present disclosure. In FIGS. 7A to 7C, for the convenience of description, among components of the display device 100, only the tape spring drum 151, the tape spring case 152, the corrugate spring 153, and the tape spring 161 are illustrated.

First, referring to FIG. 7A, the tape spring case 152 accommodates the tape spring drum 151 and the corrugate spring 153. One end of the tape spring 161 is fixed to the tape spring drum 151. One end of the tape spring 161 fixed to the tape spring drum 151 is in contact with the corrugate spring 153. In FIG. 7A, the tape spring 161 is fully unwound, but is not limited thereto.

Referring to FIG. 7B, the tape spring 161 is wound on the tape spring drum 151 approximately one time, by the rotation of the tape spring drum 151. A sum of diameters of the tape spring drum 151 and the tape spring 161 wound on the tape spring drum 151 is larger in a state of FIG. 7B than in a state of FIG. 7A. The distance between the plurality of first parts 153a and the tape spring drum 151 may be larger in the state of FIG. 7B than in the state of FIG. 7A. Further, the distance between the plurality of first parts 153a and the tape spring case 152 may be smaller in the state of FIG. 7B than in the state of FIG. 7A. Further, a curvature of the plurality of first parts 153a and a curvature of the plurality of second parts 153b may be smaller in the state of FIG. 7B than in the state of FIG. 7A.

Referring to FIG. 7C, the tape spring 161 is wound on the tape spring drum 151 approximately two times, by the rotation of the tape spring drum 151. A sum of diameters of the tape spring drum 151 and the tape spring 161 wound on the tape spring drum 151 is larger in a state of FIG. 7C than in a state of FIG. 7B. The distance between the plurality of first parts 153a and the tape spring drum 151 may be larger in the state of FIG. 7C than in the state of FIG. 7B. The distance between the plurality of first parts 153a and the tape spring case 152 may be smaller in the state of FIG. 7C than in the state of FIG. 7B. Further, a curvature of the plurality of first parts 153a and a curvature of the plurality of second parts 153b may be smaller in the state of FIG. 7C than in the state of FIG. 7B.

That is, as the number of rotations of the tape spring 161 on the tape spring drum 151 increases, the distance between the plurality of first parts 153a and the tape spring drum 151 increases and the distance between the plurality of first parts 153a and the tape spring case 152 decreases. Further, as the number of rotations of the tape spring 161 on the tape spring drum 151 increases, the curvatures of the plurality of first parts 153a and the plurality of second parts 153b decrease. In other words, the shape of the corrugate spring 153 may be elastically modified as the tape spring 161 is wound or unwound.

Specifically, the corrugate spring 153 is configured to press the tape spring 161. That is, the corrugate spring 153 pressurizes the tape spring 161 toward the tape spring drum 151 so that the tape spring 161 comes into close contact with the tape spring drum 151. Accordingly, when the tape spring 161 is wound or unwound, the gap or the slip phenomenon between the tape springs 161 may be suppressed.

When the tape spring is wound or unwound on the tape spring drum, it may be somewhat difficult to always wind or unwind the tape spring with a constant tension due to various driving environments. For example, an outer diameter of the tape spring wound on the tape spring drum is reduced during the winding and is increased during the unwinding. Therefore, a gap may be generated between the tape springs wound on the tape spring drum. For example, a space may be generated between a first wound tape spring and a second wound tape spring on the tape spring drum. This gap causes the slip phenomenon that the position of the tape spring is displaced, which causes the slip between the tape spring and the display unit. By doing this, when the display unit vertically moves, a slippage that the speed is partially changed is caused and the quality of the display device is degraded.

In the display device 100 according to the exemplary embodiment of the present disclosure, the corrugate spring 153 is disposed between the tape spring drum 151 and the tape spring case 152. The corrugate spring 153 is configured to press the tape spring 161 which is wound to or unwound from the tape spring drum 151 toward the tape spring drum 151. The corrugate spring 153 guides the tape spring 161 to be wound with a constant curvature and a constant tension. Therefore, the tape spring 161 is wound or unwound while being in close contact with the tape spring drum 151. Accordingly, the gap generated between the wound tape springs 161 may be suppressed. Further, the slip between the tape springs 161 and between the tape spring 161 and the display unit DP may be suppressed. Accordingly, the display unit DP is stably lifted and lowered by the tape spring 161 and the quality of the display device 100 may be improved.

In the display device 100 according to the exemplary embodiment of the present disclosure, the tape spring case 152 is configured to include a guide portion 152a. The guide portion 152a protrudes from an end portion of the tape spring case 152 toward the opening of the tape spring case 152. Therefore, the guide portion 152a guides the path of the tape spring 161 which moves through the opening of the tape spring case 152. Therefore, the tape spring 161 may be more stably wound or unwound through a predetermined path by the guide portion 152a. That is, the guide portion 152a may suppress the change of the path when the tape spring 161 is wound or unwound. Therefore, the tape spring 161 may be more stably wound or unwound. Further, the slip phenomenon by the path change of the tape spring 161 is suppressed and the slippage of the display unit DP is effectively improved.

Figure 8A:
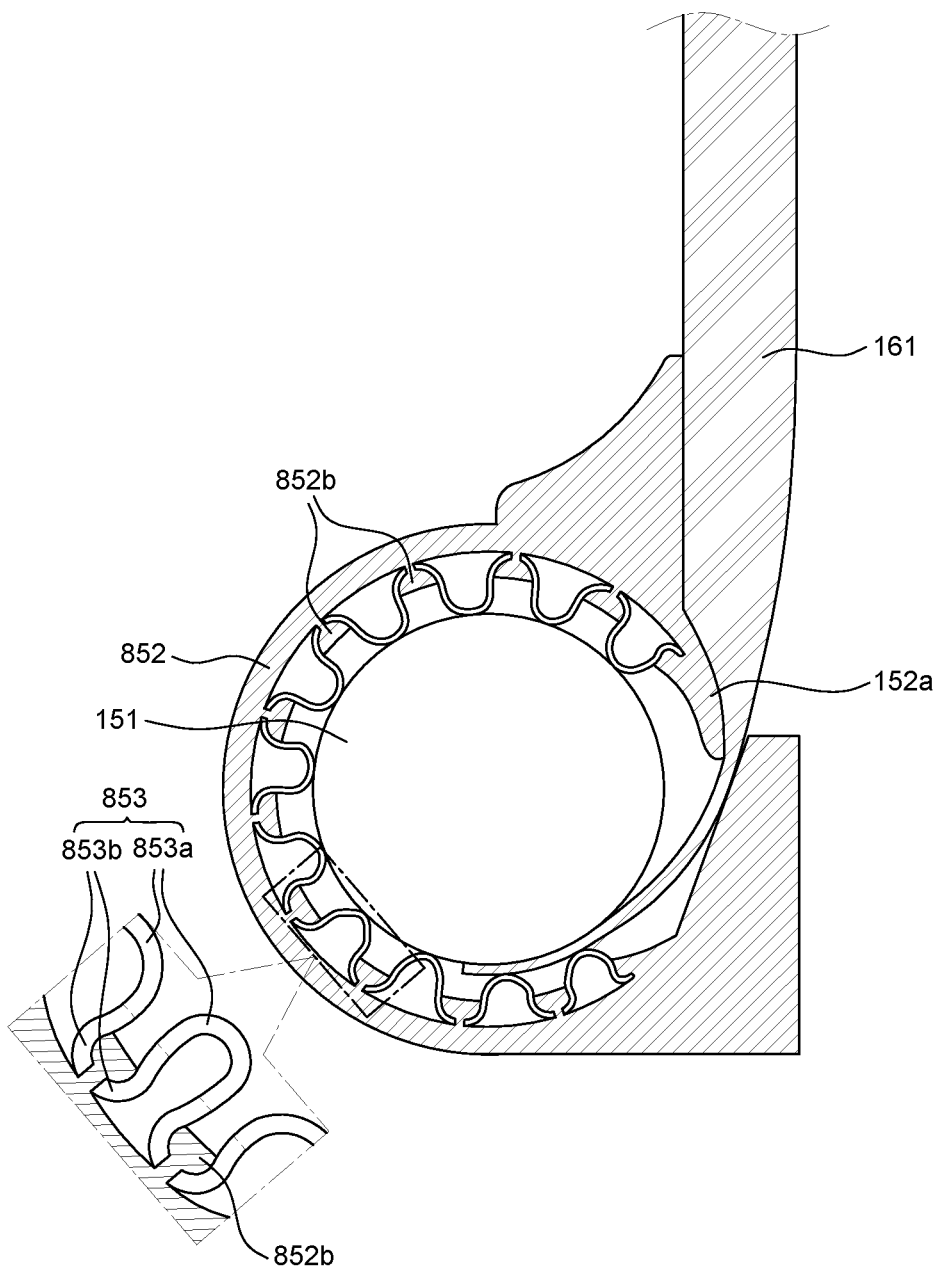
FIG. 8A is a cross-sectional view of a second roller of a display device according to another exemplary embodiment of the present disclosure.
Figure 8B:
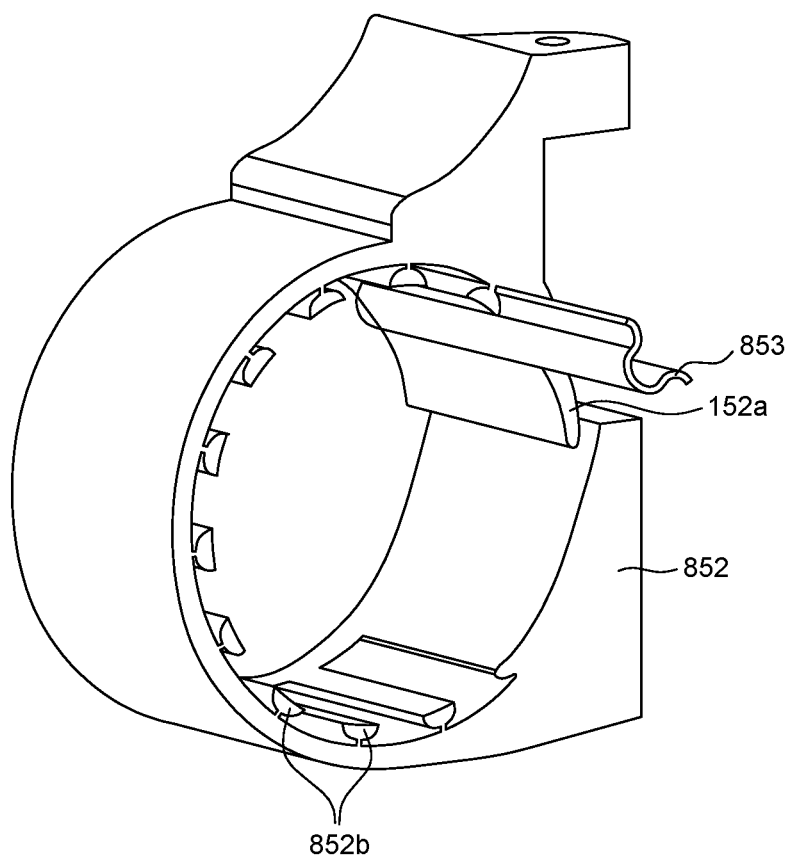
FIG. 8B is a perspective view of a second roller of a display device according to another exemplary embodiment of the present disclosure.

FIG. 8A is a cross-sectional view of a second roller of a display device according to another exemplary embodiment of the present disclosure. FIG. 8B is a perspective view of a second roller of a display device according to another exemplary embodiment of the present disclosure.

Referring to FIGS. 8A and 8B, the tape spring case 852 accommodates the tape spring drum 151 and the corrugate spring. One end of the tape spring 161 is fixed to the tape spring drum 151. Therefore, the tape spring 161 is wound to or unwound from the tape spring drum 151 by the rotation of the tape spring drum 151. At this time, the corrugate spring is configured to press the tape spring 161 wound on the tape spring drum 151. Therefore, the tape spring 161 is wound or unwound while being in close contact with the tape spring drum 151. Accordingly, the gap generated between the wound tape springs 161 or the slip generated between the tape spring 161 and the display unit DP may be suppressed.

The corrugate spring is configured by a plurality of spaced corrugate structures 853. Each of the plurality of corrugate structures 853 includes a protruding part 853a and a pair of extension parts 853b. The protruding part 853a may refer to a bent portion of the corrugate structure 853 to be in contact with the tape spring 161 or the tape spring drum 151. The pair of extension parts 853b refers to portions which extend from one end and the other end of the protruding part 853a and are coupled to the tape spring case 852.

The plurality of corrugate structures 853 are coupled to the tape spring case 852 by the pair of extension parts 853b. At this time, the tape spring case 852 includes a plurality of coupling parts 852b which protrude from an inner surface to be coupled to the pair of extension parts 853b. The plurality of coupling parts 852b may be configured to include a structure to which the extension part 853a is coupled through one side and the other side. Further, one of the pair of extension parts 853b of the corrugate structure 853 and one of the pair of extension parts 853b of another adjacent corrugate structure 853 may be fastened with one coupling part 852b. However, the fastening shape of the plurality of coupling parts 852b and the plurality of corrugate structures 853 is not limited to the structure illustrated in FIGS. 8A and 8B and may be changed in various shapes depending on the design.

As the number of rotations of the tape spring 161 on the tape spring drum 151 increases, the distance between the protruding part 853a and the tape spring drum 151 increases and the distance between the protruding part 853a and the tape spring case 852 decreases. Further, as the number of rotations of the tape spring 161 on the tape spring drum 151 increases, the curvature of the protruding part 853a decreases.

In the display device 100 according to another exemplary embodiment of the present disclosure, the corrugate spring is disposed between the tape spring drum 151 and the tape spring case 852. The corrugate spring is configured to press the tape spring 161 which is wound to or unwound from the tape spring drum 151 toward the tape spring drum 151. Accordingly, the gap generated between the wound tape springs 161 may be suppressed. Further, the slip between the tape springs 161 and between the tape spring 161 and the display unit DP may be suppressed. Accordingly, the display unit DP is stably lifted and lowered by the tape spring 161 and the quality of the display device may be improved.

In the display device according to another exemplary embodiment of the present disclosure, the corrugate spring is divided into a plurality of corrugate structures 853. Further, the plurality of corrugate structures 853 are coupled to the plurality of coupling parts 852b formed in the tape spring case 852. That is, the corrugate spring is divided into a plurality of corrugate structures 853 with a smaller volume so that it is advantageous in terms of workability and assembly.

The exemplary embodiments of the present disclosure can also be described as follows:

According to an aspect of the present disclosure, a display device includes: a display unit including a display panel in which an image is displayed; a first roller configured to wind or unwind the display unit; a tape spring which vertically moves the display unit on a rear surface of the display unit; and a second roller configured to wind or unwind the tape spring, the second roller includes: a tape spring drum to which one end of the tape spring is fixed and configured to wind or unwind the tape spring; a tape spring case accommodating the tape spring drum and the tape spring; and a corrugate spring between the tape spring drum and the tape spring case and configured to press the tape spring toward the tape spring drum.

The corrugate spring may include: a plurality of first parts curved to be in contact with the tape spring; and a plurality of second parts curved to be in contact with the tape spring case, and the plurality of first parts and the plurality of second parts may be alternately disposed.

The plurality of first parts and the plurality of second parts may be integrally disposed.

As the number of rotations of the tape spring on the tape spring drum increases, the distance between the plurality of first parts and the tape spring drum increases and the distance between the plurality of first parts and the tape spring case decreases.

As the number of rotations of the tape spring on the tape spring drum increases, curvatures of the plurality of first parts and the plurality of second parts decrease.

The corrugate spring may include a plurality of corrugate structures which are spaced apart from each other and the plurality of corrugate structures may be coupled to the tape spring case.

Each of the plurality of corrugate structures may include: a protruding part which is in contact with the tape spring; and a pair of extension parts extending from one end and the other end of the protruding part and to be coupled to the tape spring case.

The tape spring case may include a plurality of coupling parts which protrudes from an inner surface to be coupled to the pair of extension parts of the plurality of corrugate structures.

The plurality of corrugate structures may include a first corrugate structure and a second corrugate structure adjacent to each other, and one of the pair of extension parts of the first corrugate structure and one of the pair of extension parts of the second corrugate structure may be fastened with one of the plurality of coupling parts.

As the number of rotations of the tape spring on the tape spring drum increases, the distance between the protruding part and the tape spring drum increases and the distance between the protruding part and the tape spring case decreases.

As the number of rotations of the tape spring on the tape spring drum increases, a curvature of the protruding part decreases.

The display device may further include: a first gear coupled to an end portion of the first roller to rotate together with the first roller; a second gear configured to rotate together with the second roller; a third gear engaged with the first gear and the second gear between the first gear and the second gear; and a motor connected to the second roller to rotate the second roller.

The display device may further include: a tape spring supporter which guides the winding or unwinding of the tape spring above the tape spring case.

The tape spring case may include: an opening through which the tape spring enters or exits; and a guide portion protruding from an end portion of the tape spring case toward the opening to guide a path of the tape spring.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:
    a display unit including a display panel in which an image is displayed;
    a first roller configured to wind or unwind the display unit;
    a tape spring which vertically moves the display unit on a rear surface of the display unit; and
    a second roller configured to wind or unwind the tape spring,
    wherein the second roller includes:
    a tape spring drum to which one end of the tape spring is fixed and configured to wind or unwind the tape spring;
    a tape spring case accommodating the tape spring drum and the tape spring; and
    a corrugate spring between the tape spring drum and the tape spring case and configured to press the tape spring toward the tape spring drum,
    wherein curvatures of parts of the corrugate spring or distances between the parts of the corrugate spring and the tape spring drum vary as the tape spring rotates on the tape spring drum.

2. The display device according to claim 1, wherein the corrugate spring includes:
    a plurality of first parts curved to be in contact with the tape spring; and
    a plurality of second parts curved to be in contact with the tape spring case, and
    wherein the plurality of first parts and the plurality of second parts are alternately disposed.

3. The display device according to claim 2, wherein the plurality of first parts and the plurality of second parts are integrally disposed.

4. The display device according to claim 2, wherein as the number of rotations of the tape spring on the tape spring drum increases, the distance between the plurality of first parts and the tape spring drum increases and the distance between the plurality of first parts and the tape spring case decreases.

5. The display device according to claim 2, wherein as the number of rotations of the tape spring on the tape spring drum increases, curvatures of the plurality of first parts and the plurality of second parts decrease.

6. The display device according to claim 1, wherein the corrugate spring includes a plurality of corrugate structures which are spaced apart from each other and the plurality of corrugate structures are coupled to the tape spring case.

7. The display device according to claim 6, wherein each of the plurality of corrugate structures includes:
    a protruding part which is in contact with the tape spring; and
    a pair of extension parts extending from one end and the other end of the protruding part and coupled to the tape spring case.

8. The display device according to claim 7, wherein the tape spring case includes a plurality of coupling parts which protrude from an inner surface to be coupled to the pair of extension parts of the plurality of corrugate structures.

9. The display device according to claim 8, wherein the plurality of corrugate structures include a first corrugate structure and a second corrugate structure adjacent to each other, and
   wherein one of the pair of extension parts of the first corrugate structure and one of the pair of extension parts of the second corrugate structure are fastened with one of the plurality of coupling parts.

10. The display device according to claim 7, wherein as the number of rotations of the tape spring on the tape spring drum increases, the distance between the protruding part and the tape spring drum increases and the distance between the protruding part and the tape spring case decreases.

11. The display device according to claim 7, wherein as the number of rotations of the tape spring on the tape spring drum increases, a curvature of the protruding part decreases.

12. The display device according to claim 1, further comprising:
   a first gear coupled to an end portion of the first roller to rotate together with the first roller;
   a second gear configured to rotate together with the second roller;
   a third gear engaged with the first gear and the second gear between the first gear and the second gear; and
   a motor connected to the second roller to rotate the second roller.

13. The display device according to claim 1, further comprising:
   a tape spring supporter which guides the winding or unwinding of the tape spring above the tape spring case.

14. The display device according to claim 1, wherein the tape spring case includes:
   an opening through which the tape spring enters or exits; and
   a guide portion protruding from an end portion of the tape spring case toward the opening to guide a path of the tape spring.

* * * * *